(12) United States Patent
Johnson

(10) Patent No.: US 11,219,822 B2
(45) Date of Patent: Jan. 11, 2022

(54) ELECTRONIC GAMING LAP BOARD

(71) Applicant: Brandon Lamar Johnson, Fayetteville, NC (US)

(72) Inventor: Brandon Lamar Johnson, Fayetteville, NC (US)

( * ) Notice: Subject to any disclaimer, the term of this patent is extended or adjusted under 35 U.S.C. 154(b) by 0 days.

(21) Appl. No.: 16/720,340

(22) Filed: Dec. 19, 2019

(65) Prior Publication Data

US 2021/0187388 A1 Jun. 24, 2021

(51) Int. Cl.
*A63F 13/98* (2014.01)
*A63F 13/28* (2014.01)
*A63F 13/215* (2014.01)
*A63F 13/235* (2014.01)

(52) U.S. Cl.
CPC ............ *A63F 13/28* (2014.09); *A63F 13/215* (2014.09); *A63F 13/235* (2014.09)

(58) Field of Classification Search
CPC ........ A63F 13/28; A63F 13/235; A63F 13/98; A63F 13/90
USPC ............................................... 463/30, 47, 46
See application file for complete search history.

(56) References Cited

U.S. PATENT DOCUMENTS

| | | | | |
|---|---|---|---|---|
| 1,859,320 A | * | 5/1932 | Wetmore | A47B 23/041 108/115 |
| 2,150,850 A | * | 3/1939 | Smith | A63F 1/06 273/148 R |
| 2,471,003 A | * | 5/1949 | Monahan | A47B 23/002 108/9 |
| 2,506,189 A | * | 5/1950 | Attridge | A63F 9/1044 273/157 R |
| 2,676,597 A | * | 4/1954 | Colbert | A45D 29/22 132/73 |
| 2,686,094 A | * | 8/1954 | Terry | A47B 23/046 108/8 |
| 2,783,109 A | * | 2/1957 | Frey | A47G 23/0608 108/43 |
| 2,844,429 A | * | 7/1958 | Frey | A47B 23/002 108/43 |
| 3,031,242 A | * | 4/1962 | Sawle, III | B60N 3/004 297/135 |
| 3,032,916 A | * | 5/1962 | Oakes | A47B 23/002 108/41 |
| 3,361,091 A | * | 1/1968 | Inman | A47B 23/002 108/43 |
| 3,730,077 A | * | 5/1973 | Selden | A47B 19/10 108/43 |

(Continued)

*Primary Examiner* — Chase E Leichliter
(74) *Attorney, Agent, or Firm* — Dunlap Bennett & Ludwig, PLLC; Brendan E. Squire

(57) ABSTRACT

An electronic gaming lap board provides a support rest for a gamer's elbows and forearms while operating a controller during play in a gaming environment. The electronic gaming lap board facilitates the maintenance of good posture while the gamer is engaged with the gaming environment. One or more gaming enhancement devices may be carried by the electronic gaming lap board, including acoustic, vibratory, and illumination devices. A communications module may electrically connect the one or more gaming enhancement devices to one or more of a game console, mobile computing device, cellular phone, or tablet device. The communications module may also provide a broadband wireless hotspot for connection of the game console or mobile computing device to a computer network.

9 Claims, 4 Drawing Sheets

(56) References Cited

U.S. PATENT DOCUMENTS

| | | | | | |
|---|---|---|---|---|---|
| 3,791,314 | A * | 2/1974 | Berretta | A47B 23/002 | 108/43 |
| 3,828,696 | A * | 8/1974 | Lockridge | B64D 25/02 | 108/43 |
| 4,003,577 | A * | 1/1977 | Bolach | A63F 3/00006 | 273/243 |
| 4,417,409 | A * | 11/1983 | Bell | D06C 3/08 | 38/102.91 |
| 4,422,640 | A * | 12/1983 | Tamarkin | A63F 13/02 | 463/47 |
| 4,491,325 | A * | 1/1985 | Bersheim | A63F 13/06 | 463/38 |
| 4,494,754 | A * | 1/1985 | Wagner, Jr. | A63F 13/02 | 273/148 B |
| 4,494,755 | A * | 1/1985 | Caillouet, Jr. | A63F 13/02 | 463/47 |
| 4,504,059 | A * | 3/1985 | Weinrieb | A63F 13/08 | 273/148 B |
| 4,518,164 | A * | 5/1985 | Hayford, Jr. | A63F 13/06 | 273/148 B |
| D281,657 | S * | 12/1985 | Roczey | | 248/918 |
| D281,937 | S * | 12/1985 | Roczey | | D6/406.4 |
| D286,711 | S * | 11/1986 | Roczey | | D6/406.4 |
| 4,648,603 | A * | 3/1987 | Hayford, Jr. | A63F 13/02 | 273/148 B |
| 4,909,514 | A * | 3/1990 | Tano | A63F 13/02 | 273/148 B |
| 5,007,192 | A * | 4/1991 | Hochberg | G09B 19/00 | 40/661 |
| D322,163 | S * | 12/1991 | Shu | | D12/420 |
| 5,207,791 | A * | 5/1993 | Scherbarth | A63F 13/08 | 273/148 B |
| 5,209,478 | A * | 5/1993 | Simpson | A63F 13/98 | 273/148 B |
| 5,255,612 | A * | 10/1993 | Anderson | A47B 23/002 | 108/115 |
| 5,263,423 | A * | 11/1993 | Anderson | F16M 11/38 | 108/43 |
| 5,269,524 | A * | 12/1993 | Womack | A63F 3/0023 | 273/157 R |
| 5,362,063 | A * | 11/1994 | Cummings | A63F 1/10 | 108/27 |
| 5,419,613 | A * | 5/1995 | Wedeking | A47C 7/72 | 297/217.1 |
| D361,452 | S * | 8/1995 | Neylon | | D6/406.6 |
| 5,480,058 | A * | 1/1996 | Hutchins | A47B 5/04 | 206/549 |
| 5,487,668 | A * | 1/1996 | Oyen | A63F 9/06 | 434/98 |
| 5,540,443 | A * | 7/1996 | Ballan | A63F 3/0023 | 273/285 |
| 5,713,548 | A * | 2/1998 | Boyer | F16M 13/00 | 248/205.2 |
| 5,833,200 | A * | 11/1998 | Patterson | A47B 23/002 | 248/456 |
| 6,044,758 | A * | 4/2000 | Drake | A47B 23/001 | 100/43 |
| 6,092,867 | A * | 7/2000 | Miller | A63F 13/98 | 297/188.14 |
| 6,113,052 | A * | 9/2000 | Gentile | A47B 23/043 | 108/9 |
| 6,116,165 | A * | 9/2000 | Kadesky | A47B 23/002 | 108/161 |
| 6,173,656 | B1 * | 1/2001 | Blanchard | A47B 23/002 | 108/43 |
| 6,290,228 | B1 * | 9/2001 | Roberts | A63F 13/08 | 273/148 B |
| 7,673,908 | B2 * | 3/2010 | Liptan | B43L 3/005 | 281/45 |
| 8,635,959 | B1 * | 1/2014 | Silknitter | A47G 23/0608 | 108/43 |
| 8,807,569 | B1 * | 8/2014 | Davis | A63B 43/06 | 273/371 |
| 8,850,992 | B1 * | 10/2014 | Akpaffiong | A47B 23/002 | 108/43 |
| 8,902,159 | B1 * | 12/2014 | Matthews | G06F 3/016 | 345/156 |
| 2002/0145019 | A1 * | 10/2002 | Ulibarri | B42D 5/005 | 224/267 |
| 2004/0083932 | A1 * | 5/2004 | Kottman | A47B 3/00 | 108/115 |
| 2005/0110309 | A1 * | 5/2005 | Cziraky | A63H 3/003 | 297/181 |
| 2005/0176508 | A1 * | 8/2005 | Chastain | B60R 11/02 | 463/46 |
| 2005/0252422 | A1 * | 11/2005 | Sharpe | A47B 3/00 | 108/35 |
| 2005/0264992 | A1 * | 12/2005 | Eriksson | A47B 23/002 | 361/679.46 |
| 2008/0001355 | A1 * | 1/2008 | Sparling | A63F 13/98 | 273/148 B |
| 2010/0300334 | A1 * | 12/2010 | Tcholakov | A47B 3/08 | 108/127 |
| 2011/0185951 | A1 * | 8/2011 | Aguayo | A47B 23/00 | 108/43 |
| 2012/0300376 | A1 * | 11/2012 | Chang | A63F 13/98 | 361/679.01 |
| 2013/0012322 | A1 * | 1/2013 | Pena | A63F 13/98 | 463/38 |
| 2013/0059667 | A1 * | 3/2013 | Nadal Berlinches | G09B 9/04 | 463/47 |
| 2014/0091526 | A1 * | 4/2014 | Nally | A63B 63/08 | 273/402 |
| 2014/0370982 | A1 * | 12/2014 | Liu | A63F 13/90 | 463/31 |
| 2014/0374457 | A1 * | 12/2014 | Piccolo | A63F 13/98 | 224/600 |
| 2015/0053120 | A1 * | 2/2015 | Coffin | A47B 23/002 | 108/6 |
| 2015/0296976 | A1 * | 10/2015 | Janowski | G06F 1/16 | 108/43 |
| 2015/0335139 | A1 * | 11/2015 | Orr, Jr. | A45F 5/00 | 224/222 |
| 2016/0067594 | A1 * | 3/2016 | Schwind | A63F 3/0023 | 463/31 |
| 2017/0262016 | A1 * | 9/2017 | Janowski | A45F 3/14 | |
| 2017/0333798 | A1 * | 11/2017 | Hnida | A63F 13/98 | |
| 2018/0196466 | A1 * | 7/2018 | Koriyama | G06F 1/1626 | |
| 2020/0030691 | A1 * | 1/2020 | Barlet | A63F 13/24 | |
| 2021/0187388 | A1 * | 6/2021 | Johnson | A63F 13/235 | |

* cited by examiner

ELECTRONIC GAMING LAP BOARD

BACKGROUND OF THE INVENTION

The present invention relates to electronic gaming devices and, more particularly, to accessories for electronic gaming devices.

Despite the proliferation of electronic gaming devices, controllers, and platforms on which games may be played, electronic gaming can still be detrimental to a gamer's comfort and posture, particularly during extended game play.

Whether the electronic game is played with a separate controller or through a touch screen display on a mobile phone, tablet, or other device, there are few products that may provide comforting support to a gamer's hands and forearms, while fostering correct posture. In most instances, the gamer may simply rest their game controller or mobile device in their lap, and otherwise slouch into a couch or chair while playing an electronic game.

Likewise, while there are advanced gaming feature chairs and furnishings that can provide gaming enhancements, such as sounds, vibration, and the like, these can be prohibitively expensive and are not readily portable to allow the gamer to easily transport to enjoy their gaming experience on the go.

As can be seen, there is a need for an improved gaming accessory that addresses these deficiencies.

SUMMARY OF THE INVENTION

In one aspect of the present invention, an electronic gaming lap board is disclosed. The electronic gaming lap board includes a rectangular shaped board dimensioned to rest across the thighs of a user. The rectangular shaped board has a padded top surface, having a first segment and a second segment hingedly joined for tilting of the first segment relative to the second segment. One or more gaming experience enhancement devices are carried by the rectangular shaped board. The one or more gaming experience enhancement devices are configured to be coupled to one of a game console or a mobile computing device. A power source is provided for operation of the one or more gaming experience enhancement devices.

In some embodiments, the one or more gaming experience enhancement devices includes at least one light emitting diode (LED) light strip disposed along a lateral side edge of the rectangular shaped board.

In other embodiments, the one or more gaming experience enhancement devices includes a plurality of speaker elements configured for electronic connection to at least one of the game console and the mobile computing device. The one or more gaming experience enhancement devices may also include a microphone.

In other embodiments, the one or more gaming experience enhancement devices includes a vibration device configured to impart a vibratory signal to the user's legs and forearms while engaged with the gaming environment.

In another embodiment, at least one support leg is attached to the first segment and is selectively extensible between a stowed position and a retracted position. The at least one support leg is adjustable to support the first segment at a desired angle relative to the second segment. The at least one support leg is received in a recess defined in a back surface of the rectangular board when moved to the stowed position.

In yet other embodiments, a communications module is configured to provide a wireless electronic connection. The communications module may provide one or more of a Bluetooth, a Wi-Fi, or a broadband electronic connection.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, embodiments of the present invention provide an electronic gaming lap board for improved gamer experience, comfort, and posture during game play.

Figure 1:
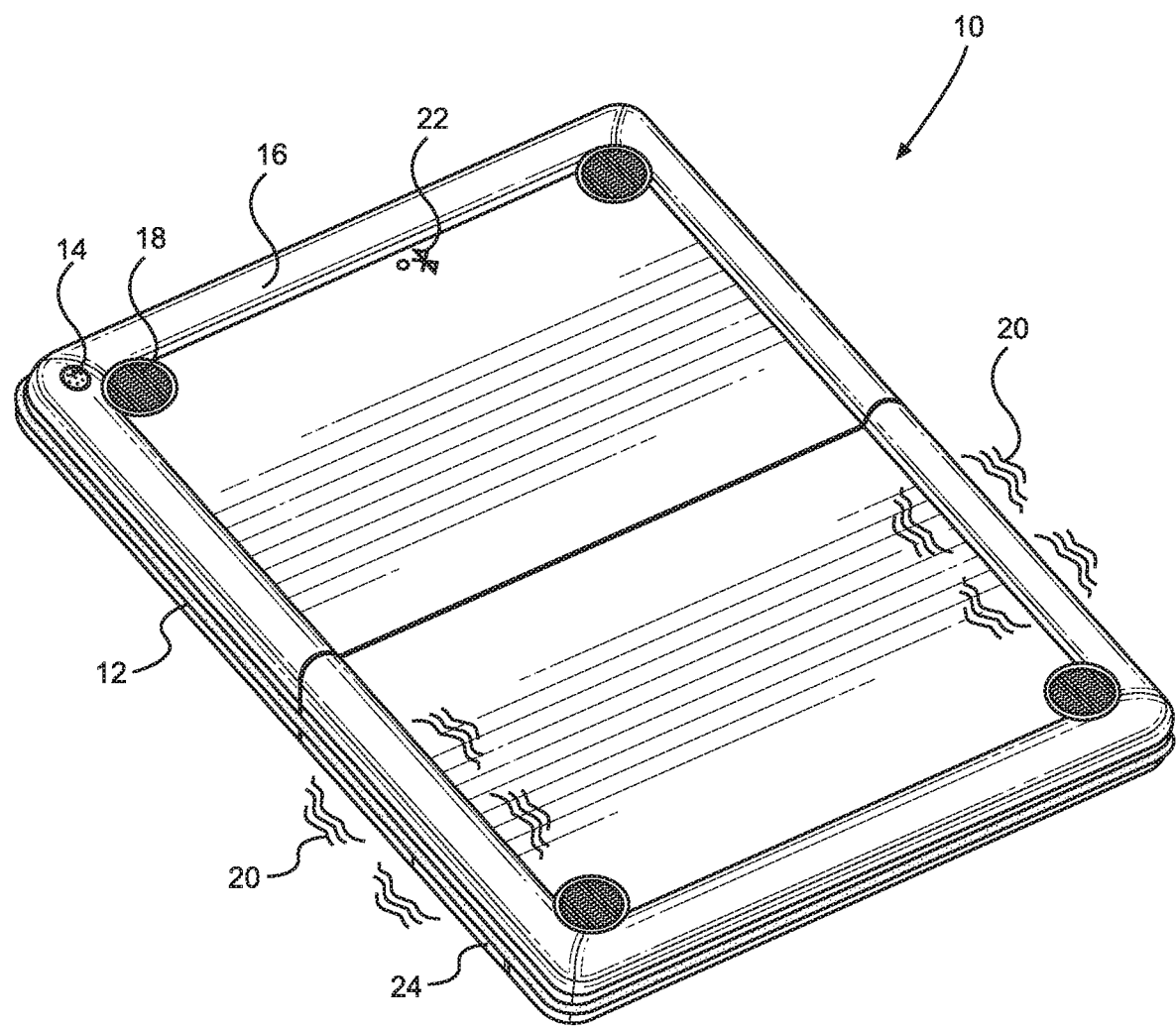
FIG. 1 is a perspective view of an electronic gaming lap board.
Figure 2:
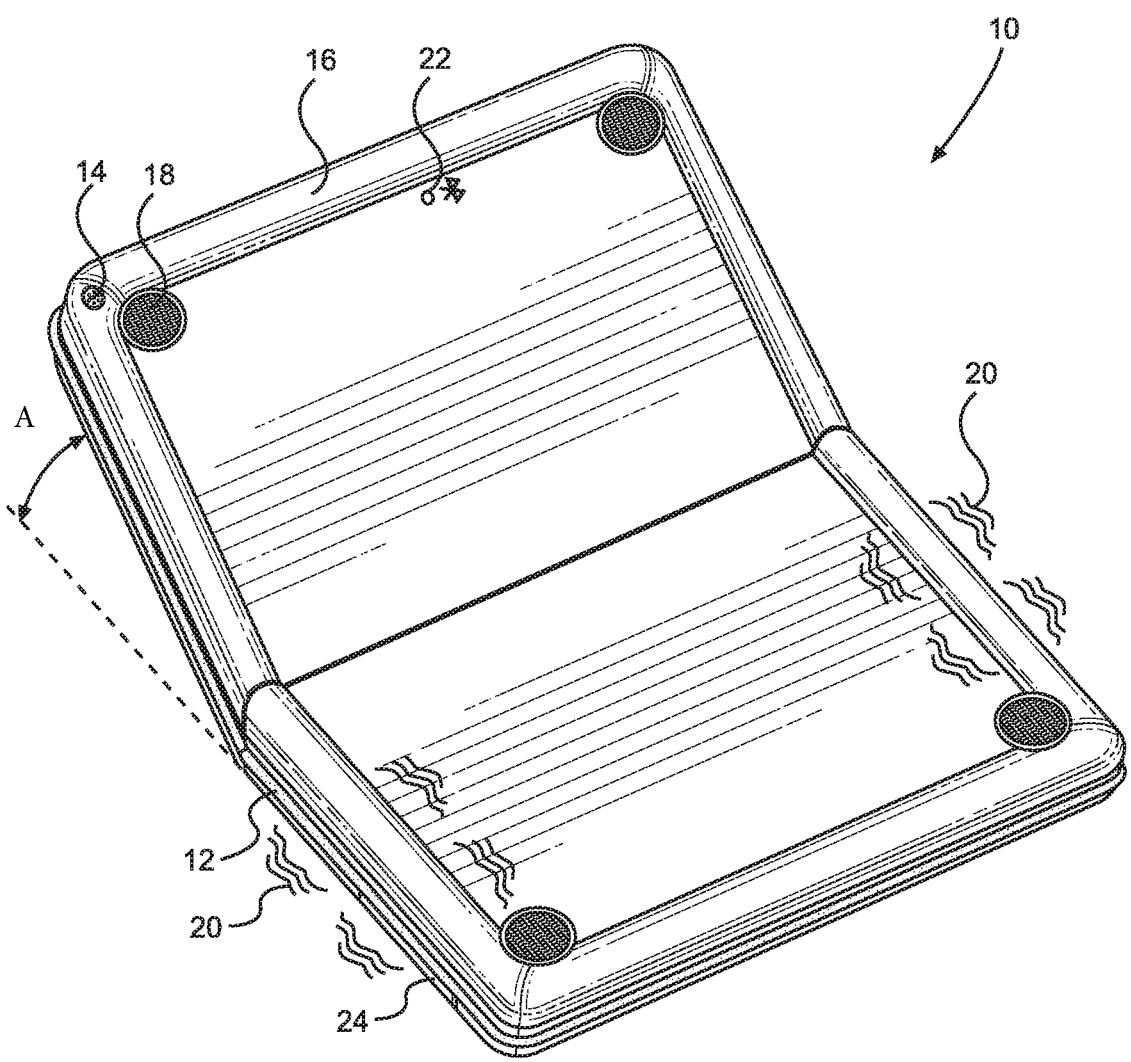
FIG. 2 is a perspective view of the an electronic gaming lap board folded at angled orientation.
Figure 3:
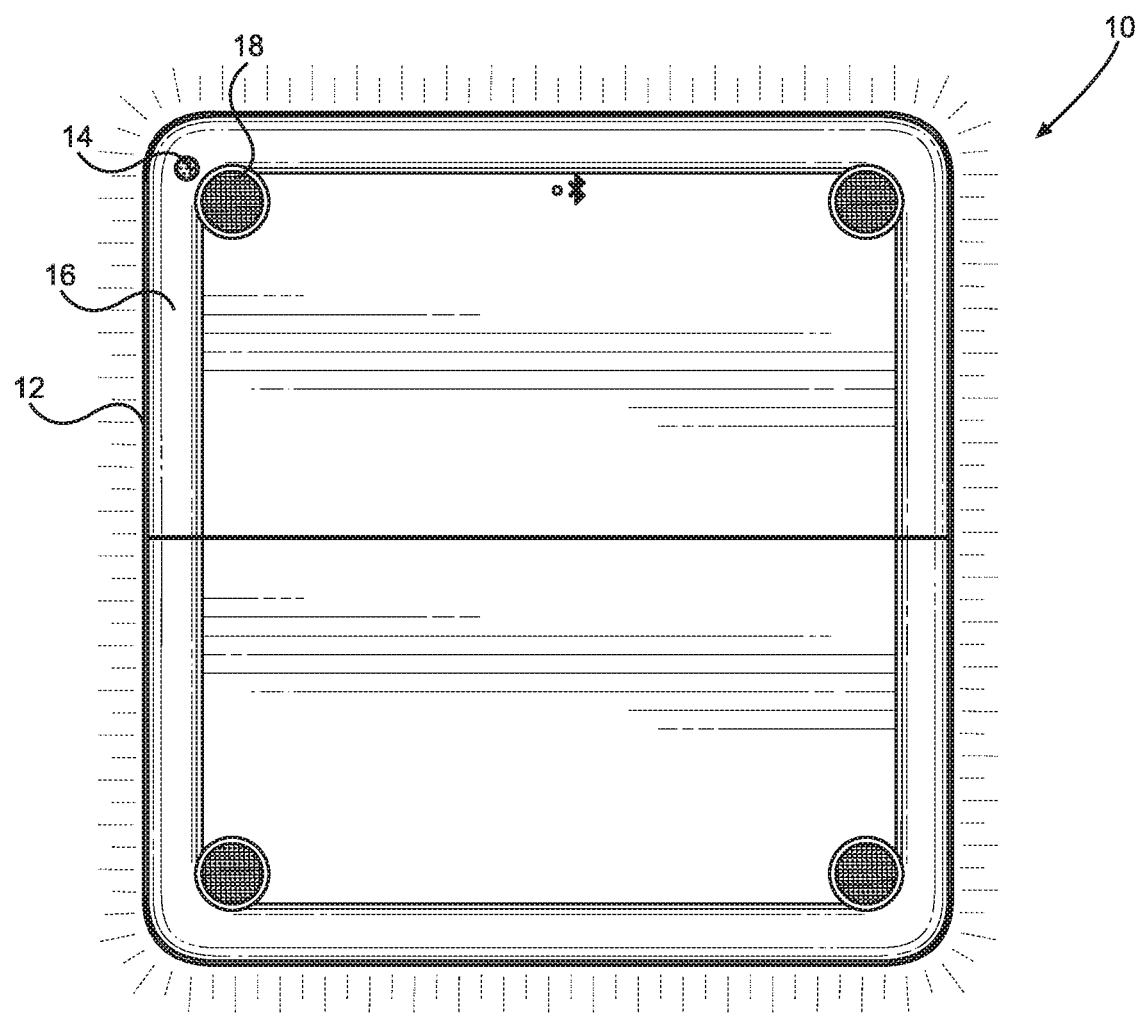
FIG. 3 is a top plan view of the electronic gaming lap board.
Figure 4:
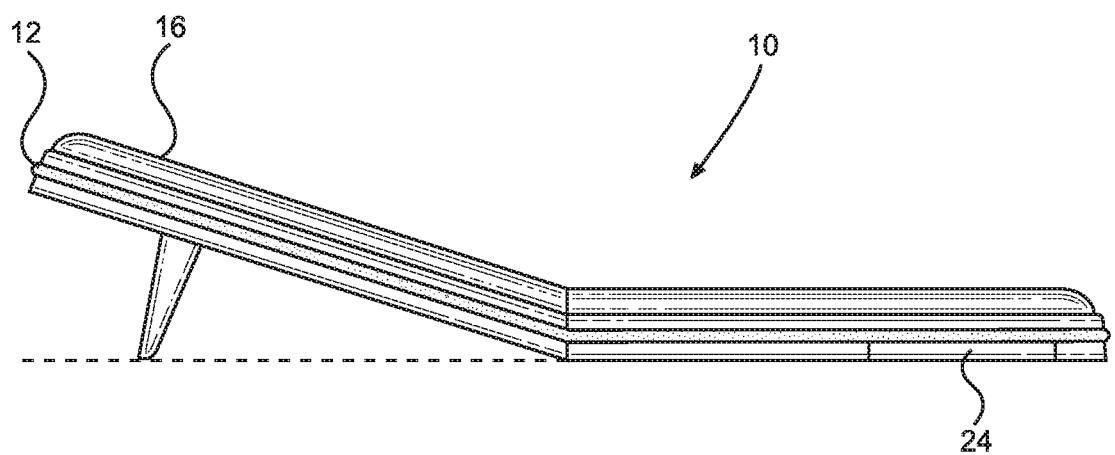
FIG. 4 is a side view of the an electronic gaming lap board.
Figure 5:
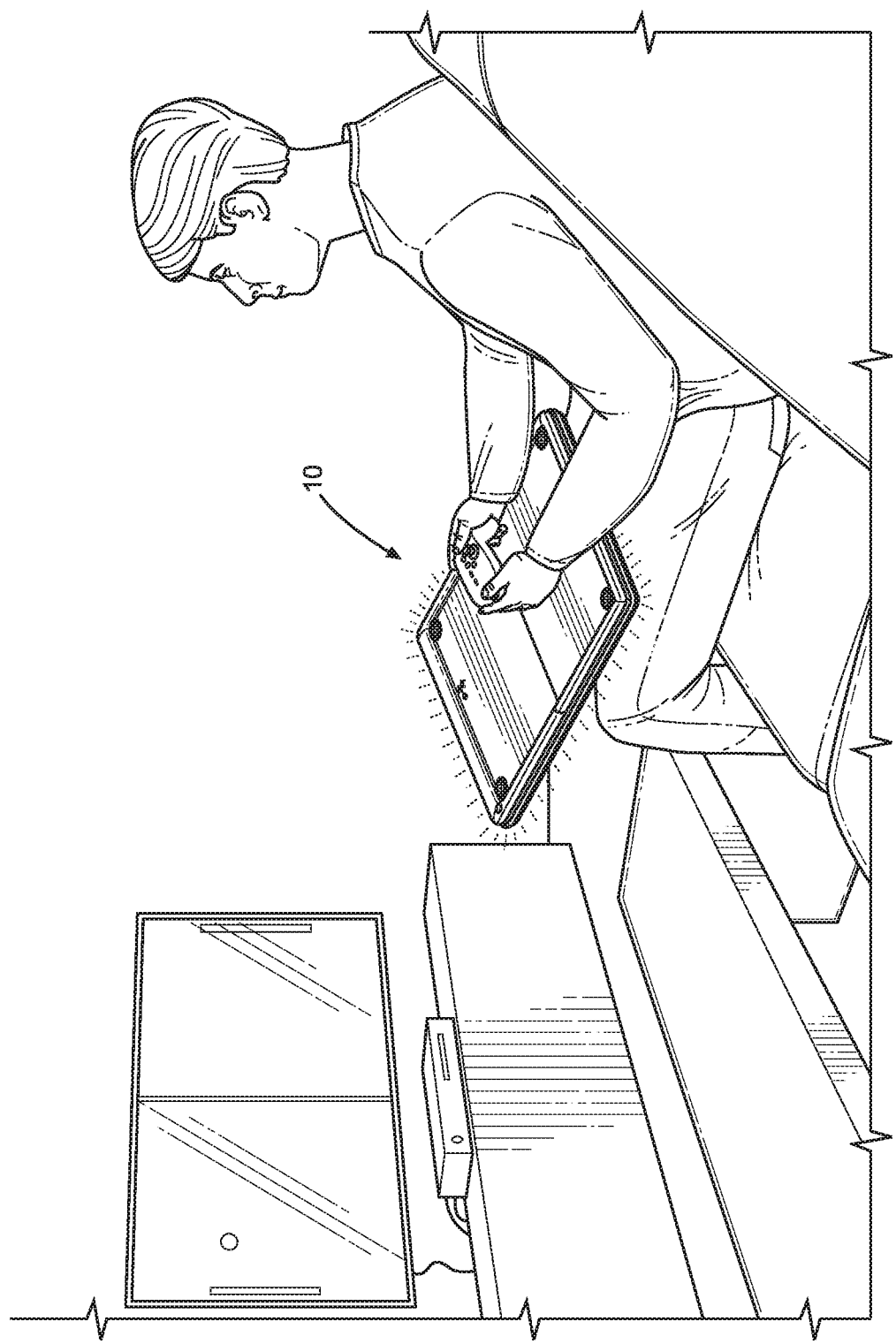
FIG. 5 is the an electronic gaming lap board shown in use.

As seen in reference to the drawings of FIGS. 1-5, an improved electronic gaming lap board 10 according to aspects of the invention includes a rectangular body, having a padded top surface 16 for comfortably supporting a gamer's forearms and elbows while engaging with a controller 22 during play of an electronic game. The electronic gaming lap board 10 is dimensioned to have a width so that it may be supported by the thighs and knees of the user, while seated in an upright condition.

The padded top surface 16 reduces pressure on the gamer's elbows and forearms and facilitates stabilization of the gamer arms and fosters proper spine posture while holding the game controller 22 or mobile computing device during use.

In some embodiments, the electronic gaming lap board 10 may be formed of a first segment and a second segment that are pivotally connected via a hinge 24 defined across a medial aspect of the rectangular board. A back surface of the electronic gaming lap board 10 may include one or more legs 26 that are selectively positionable between a stowed and a deployed position. In the stowed position the one or more legs 26 may be received in a recess of a back surface of the electronic gaming lap board 10. In the deployed position, the one or more legs 26 are configured to support a forward, or distal end of the electronic gaming lap board 10 in an elevated position. The one or more legs 26 may be adjustable to support the first segment and the second segment at a desired angle A. The angle A is adjustable to relieve hand and forearm stress of the user when holding the controller during game play.

The electronic gaming lap board 10 if the present invention may also include one or more gaming experience enhancements. By way of non-limiting example, an LED light strip 12 may be provided along an outer edge of the electronic gaming lap board 10. The light strip 12 may provide illumination to the gaming controller 22 to facilitate identification of one or more controls on the gaming controller 22 or for a selected ambiance while engaged in game play. Alternatively, the LED light strip 12 may be coupled to the gaming environment to illuminate in coordination with an event in the game environment. The LED light strip 12 may also change its illumination color to correspond with one or more game events in the game environment.

The electronic gaming lap board 10 may also include a plurality of acoustic elements, such as a microphone 14 and a speaker 18. In the gaming environment, the microphone 14 and speaker 18 are coupled for the gamer's interaction within the gaming environment. Likewise, the microphone 14 and speaker 18 may be utilized for the user to invoke voice commands and hear audible signals from an electronic device, such as their smart phone or tablet. The acoustic elements may be connectable to one of a game console or a mobile computing device via a cable or wireless connection.

The electronic gaming lap board 10 may also include one or more vibration devices 20 as a gaming experience enhancement to impart a vibratory sensation to the gamer's arms and legs during game play. The vibration mode may be provided through a plurality of layered and molded vibration strips through the entire base of the electronic gaming lap board 10. During game play the one or more vibration devices, may provide intermittent or continuous vibrating and rumbling occurs to mimic the live in-game feel and motion to the gamer using the electronic gaming lap board 10.

In some embodiments, the electronic gaming lap board 10 may include a wireless communications module 22 to electronically couple the electronic gaming lap board 10 to one or more of a gaming console, game controller, or a mobile computing device. The communications module 22 may include a Bluetooth, or other wireless communications capabilities, for coupling the electronic gaming lap board 10 to pair up and connect a computer, game console or a phone. In some embodiments, the communications module 22 may include a WiFi or broadband Internet communications capabilities for connection of a game console to an online game server or providing an Internet hotspot for connection of one or more mobile computing devices.

The electronic gaming lap board 10 may also include a power source 24, such as an internal rechargeable battery and may also include a USB port for powering the electronic gaming lap board 10 and the one or more gaming enhancement devices carried by the electronic gaming lap board 10.

It should be understood, of course, that the foregoing relates to exemplary embodiments of the invention and that modifications may be made without departing from the spirit and scope of the invention as set forth in the following claims.

What is claimed is:

1. An electronic gaming lap board, comprising:
   a rectangular shaped board dimensioned to rest across the thighs of a user, the rectangular shaped board having a padded peripheral edge defined about a top surface, the rectangular shaped board having a first segment and a second segment hingedly joined at an intermediate portion of the rectangular shaped board for tilting of the first segment towards the user relative to the second segment for supporting a gaming controller and the user's hands when holding the gaming controller during game play;
   at least one support leg attached to the first segment and selectively extensible between an extended position and a retracted position to orient the first segment towards the user when disposed in the extended position;
   one or more gaming experience enhancement devices carried by the rectangular shaped board and configured to be coupled to one of a game console or a mobile computing device; and
   a power source for operation of the one or more gaming experience enhancement devices.

2. The electronic gaming lap board of claim 1, wherein the one or more gaming experience enhancement devices includes at least one light emitting diode (LED) light strip disposed along a lateral side edge of the rectangular shaped board.

3. The electronic gaming lap board of claim 2, wherein the one or more gaming experience enhancement devices further comprises:
   a plurality of speaker elements configured for electronic connection to at least one of a game console and a mobile computing device.

4. The electronic gaming lap board of claim 3, wherein the one or more gaming experience enhancement devices further comprises:
   a microphone.

5. The electronic gaming lap board of claim 4, wherein the one or more gaming experience enhancement devices further comprises:
   a vibration device configured to impart a vibratory signal to the user's legs and forearms.

6. The electronic gaming lap board of claim 1, wherein the at least one support leg is adjustable to support the first segment at a desired angle relative to the second segment.

7. The electronic gaming lap board of claim 6, wherein the at least one support leg is received in a recess defined in a back surface of the rectangular board when moved to the stowed position.

8. The electronic gaming lap board of claim 7, further comprising:
   a communications module configured to provide a wireless electronic connection.

9. The electronic gaming lap board of claim 8, wherein the communications module provides one or more of a Bluetooth, Wi-Fi, or broadband electronic connection.

* * * * *